No. 655,095. Patented July 31, 1900.
H. S. LAND.
LATHE TOOL.
(Application filed Apr. 5, 1900.)
(No Model.)
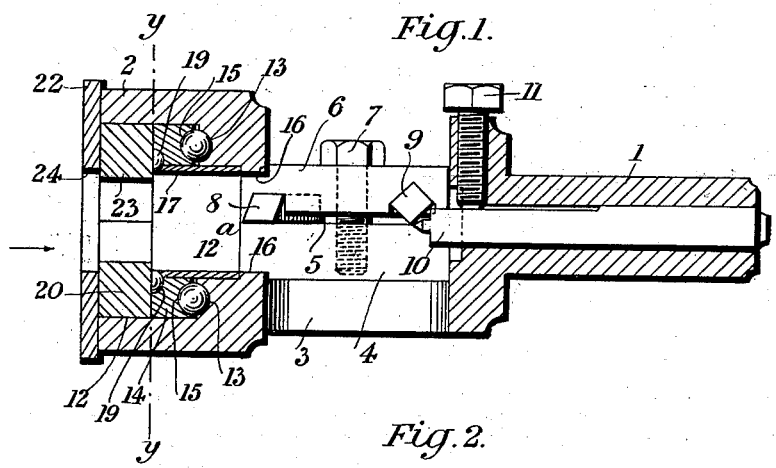
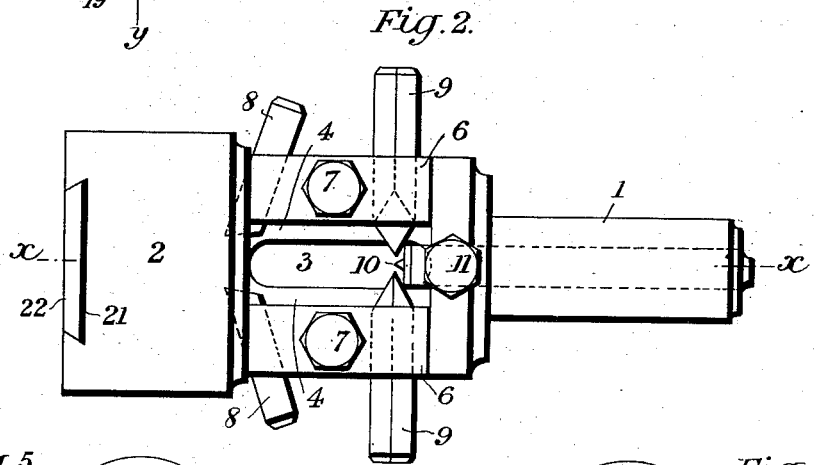
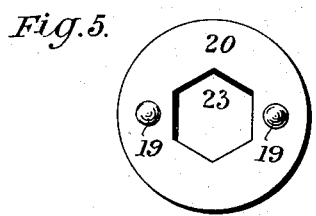
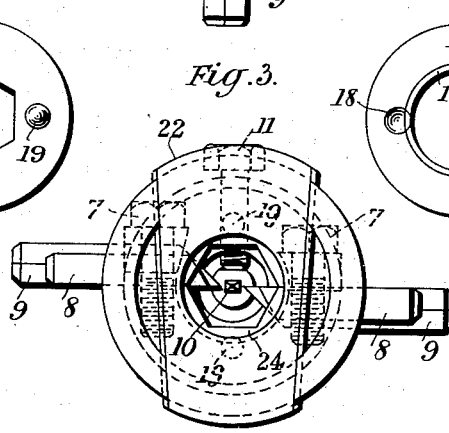
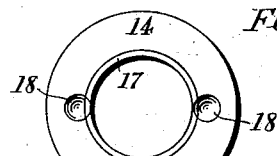
WITNESSES. INVENTOR.
THE NORRIS PETERS CO., PHOTO-LITHO., WASHINGTON, D. C.

UNITED STATES PATENT OFFICE.

HENRY STEPHEN LAND, OF LONDON, ENGLAND.

LATHE-TOOL.

SPECIFICATION forming part of Letters Patent No. 655,095, dated July 31, 1900.

Application filed April 5, 1900. Serial No. 11,825. (No model.)

*To all whom it may concern:*

Be it known that I, HENRY STEPHEN LAND, a subject of the Queen of Great Britain, residing at Waverly Park, Nunhead, London, in the county of Surrey, England, have invented a certain new and useful Improvement in Lathe-Tools, of which the following is a specification.

My invention relates to an improvement in lathe-tools adapted for cutting and shaping articles, it having been designed particularly with a view to its application to surfaces to which a rotary motion is imparted, though it is capable of acting if rotated upon a stationary work, the object being to turn or cut with great rapidity and accuracy articles of various shapes and designs, so that large numbers of articles may be produced after the cutters are once set, each one of such articles being an exact facsimile of the other.

One form of tool constructed according to my invention is illustrated in the accompanying drawings, in which—

Figure 1 is a longitudinal section of the tool on line $x\,x$, Fig. 2. Fig. 2 is a plan of the tool. Fig. 3 is an end view looking in the direction of the arrow, Fig. 1. Fig. 4 is a view of a detached part on line $y\,y$, Fig. 1, looking to the right; and Fig. 5 is a view of another detached part, also on line $y\,y$, but looking to the left.

The material or rod to be cut or shaped is preferably held in the chuck of an ordinary lathe, and the tool forming the subject of my invention is held by its shank in a turret-head or suitable sliding holder.

The tool consists of the shank 1, carrying an open neck portion connecting it with a head 2, the latter, as shown, being of cylindrical form, though it may be of any suitable shape. The neck portion has an opening 3, through which the turnings may fall, and is recessed or chambered, as shown at 4. To the upper surfaces 5 of the neck are applied clamping devices for the tools, which in this case are in the form of plates 6, held to the faces 5 by set-screws 7. In the form shown each plate 6 holds cutting-tools 8 9, which are of suitable form for the work required to be done and are placed at suitable angles, the plates being recessed to receive such cutters and maintain them in position, as shown in Fig. 1. The cutters being arranged opposite to each other, as shown, prevent the work being deflected, as it might be in the case of a deep cut made by tools acting on one side only.

The center of the shank 1 has an opening through same carrying a tool 10, which is held in position by a set-screw 11, such tool in the form shown having a point, so that it acts as a centering-tool. The head is recessed at 12 and is provided with an opening $12^a$, communicating with the chambered part 4 of the neck. A shoulder is left by such recessing, and such shoulder has a groove 13, adapted to receive antifriction-balls, which are held in place by a ring 14, Figs. 1 and 4, having a similar groove 15.

Inside the ring 14 and passing down the opening $12^a$, so that it rests upon a shoulder 16, is a sleeve 17 to protect the ball-bearing from turnings or dirt, which would impair its efficiency, and to enable this sleeve to turn with the ring 14 recesses 18 18 (shown in Fig. 4) are formed partly in the face of ring 14 and partly in the edge of sleeve 17 to receive studs 19, Figs. 1 and 5, on a collar 20, which seats in the recess 12 and which forms a revoluble holding means for the work. The front face of the head 2 is provided with an undercut groove 21, into which is passed a tapering plate 22, which when in position will hold the collar 20 and parts of the ball-bearing in place. This collar 20 is shown as provided with a hexagonal opening 23, so that it is adapted to receive a hexagonal rod of material from which the articles are to be turned; but such collar will have its opening shaped to correspond with the shape of the bar or rod which is being used. The plate 22 has an opening 24, which is larger than the opening in collar 20, so that the rod may be clear of same. The plate 22 forms a convenient means for holding the ball-bearing in place; but any suitable substitute for it may be employed.

In operation the rod of material held in a suitable revoluble chuck is passed through the opening 23, which it will fit closely, and the tool held in the turret-head is advanced so that the cutters 8 and 9 act on the same to reduce or otherwise shape it, and the cutter 10 makes a true center in the end of the work, so that subsequent operations of drilling or boring of the article, if required, can be carried on from a center which will be perfectly true with the periphery. The collar 20, ring 14, and sleeve 17 rotate with the rod, which is thus supported by a revoluble holding means close up to the first cutting-tool 8, thus enabling very accurate cutting to be effected, while the ball-bearing enables the parts to run freely. The tool is withdrawn and the work is subjected to other tools for finishing and cutting off.

It will be obvious that the ball-bearing need not be of the exact construction illustrated, as any suitable cup and cone bearing arrangement may be employed.

The cutters shown consist of pieces of square steel, one of them, 8, having a chisel edge and the other, 9, a bevel or cutting edge in the form of a graver; but such cutters may of course be of any suitable form and will be held down by a clamping-plate suitably shaped to their particular construction, so that when they are once in position they are prevented from moving, and a large amount of repetition work may be produced from them—such as is required in the case of screws, electric terminals, bolts, set-screws, tire-valves, and like articles.

It will be obvious that the tool may be held in a revoluble chuck and the work be stationary, in which case the parts of the ball-bearing which revolve in the previous case will be stationary, the surrounding part of the head revolving instead, and this arrangement I include when I employ the term "revoluble holding means."

What I claim is—

1. In a lathe-tool the combination of a shank, a neck portion attached to the said shank, cutters and means for holding the same, a head attached to the said neck portion, a revoluble holding device within said head for supporting the work, and a slide for retaining the holding device in position, substantially as described.

2. In a lathe-tool, the combination of a shank, a neck portion attached to the said shank, cutters carried by said neck portion, clamps for adjustably holding the cutters therein, a head, a collar within the said head having an opening shaped to receive and hold the work, and means for holding the said collar in place, substantially as described.

3. In a lathe-tool and in combination, a shank adapted to be held by a holding device, a neck portion, cutters carried by same, clamps for adjustably holding the cutters therein, a head, a collar carried by same having an opening shaped to receive the work and a ball-bearing for said collar adapted to reduce the friction when the work or tool is rotated substantially as described.

4. In a lathe-tool, the combination of a shank, a neck portion attached to the said shank, cutters carried by said neck portion, clamps for adjustably holding the cutters therein, a head, a collar within the said head having an opening shaped to receive and hold the work, and a slide-piece in said head for retaining the collar in place, substantially as described.

5. In a lathe-tool, the combination of a shank adapted to be held by a holding device, a centering-tool in said shank, means for holding the tool, a neck connected with the said shank, cutters adjustably held in the said neck, a head connected with the said neck, a revoluble holding device within the said head arranged for holding the work close to the cutters, and a slide for retaining the holding device in place, substantially as described.

In testimony whereof I have hereunto set my hand in the presence of two subscribing witnesses.

HENRY STEPHEN LAND.

Witnesses:
 PHILIP M. JUSTICE,
 ALLEN PERRY JONES.